Patented Jan. 11, 1927.

1,614,063

UNITED STATES PATENT OFFICE.

FREDERICK A. FRAZIER, OF BERKELEY, CALIFORNIA, ASSIGNOR TO F. A. FRAZIER COMPANY, OF SAN FRANCISCO. CALIFORNIA, A CORPORATION OF CALIFORNIA.

SULPHUR COMPOUND AND METHOD OF MAKING THE SAME.

No Drawing.    Application filed August 23, 1923.   Serial No. 658,994.

My invention relates to a compound of sodium and sulphur characterized by a high polysulphide content.

One of the objects of the invention is the provision of a sodium sulphur compound exceedingly high in polysulphides and low in thiosulphate and which is almost completely soluble in water.

Another object of the invention is the provision of a process of making a sodium sulphur compound with temperatures considerably lower than have heretofore been found necessary and in which the time element of manufacture is much reduced.

My invention possesses other objects some of which with the foregoing will be set forth in the following description of my invention. It is to be understood that I do not limit myself to the showings made by the said description as I may adopt variant forms of my invention within the scope of the claims.

Soluble sodium sulphur compounds or such compounds soluble in large measure have been made heretofore but have been relatively low in polysulphides. Since such compounds are used in aqueous solution for spraying trees, plants and vines for the purpose of controlling insect pests and fungus diseases and since the polysulphide content has the greatest insecticidal and fungicidal value, it is obvious that a sodium sulphur compound in which the polysulphides form a relatively small part does not present the value or effectiveness of a compound in which the polysulphides form the major part. Previously known compounds of this character have been high in thiosulphate which is not only much less effective than the polysulphides as an insecticide and fungicide but is more apt to damage the trees, plants or vines on which the spray is used. It is therefore also an object in such a compound to keep the thiosulphate content low. My compound is also suitable for medicinal purposes and for use in soaps, lotions and in baths. With a low thiosulphate content it is less apt to injure the skin when applied medically.

In making my compound I use 60 parts by weight of commercial sodium sulphide, 75 parts by weight of sodium carbonate and 150 parts by weight of crude sulphur. These ingredients are thoroughly mixed and placed in an iron kettle of suitable size having appropriate heating means and a valved drain pipe leading to a cooling pan, the latter having means for circulating cooling water about it. The kettle is covered with a tight lid having the necessary filling and inspection openings and provided with a vent pipe for conducting the escaping gases to the open air. Coke or oil may be used to heat the kettle and a constant even heat is desirable. It is also preferable to protect the kettle from the direct flame and to make provision for keeping the discharge pipe hot to avoid the possibility of blocking it by a solidification of the discharging mass.

The kettle is preferably heated prior to the introduction of the mixed ingredients and after placing them in the kettle fusion begins at a temperature of 180 to 230° C., continuing with the evolution of gases at a heat of from 230 to 280° C. until all gases are driven off and fusion is completed, which condition is indicated by a subsiding of action in the kettle. The mass is then a thin liquid and a portion withdrawn on a rod will burn with a clear blue flame. This point is reached in from one hour and ten minutes to one hour and fifty minutes.

When complete the melted charge is discharged into the cooling pan where it solidifies and cools, appearing then as a clear greenish-yellow cake which is quite brittle. After cooling, the cake is ground to the desired fineness and packed in tight containers.

Such a product so made has a water solubility of substantially 100% and a test sample under analysis shows the following composition.

|   | Per cent. |
|---|---|
| Sodium polysulphide | 80.82 |
| Sodium thiosulphate | 6.55 |
| Free sulphur | 7.82 |
| Sodium sulphate | 5.09 |
| Water | Trace. |

In the above composition the sodium sulphide not only aids in a quick and complete fusion of the entire mass thus reducing the time required as well as making a lower temperature effective but since it is already a compound in which one volume of sulphur is combined with two volumes of sodium, it is of distinct use in building up the polysulphide in the completed product.

I do not confine myself strictly to the proportions of materials indicated as preferable. I may use more or less sodium sulphide with a corresponding change in the amount of the sodium carbonate. A product having a maximum amount of sodium polysulphide may be made by using commercial sodium sulphide only and without sodium carbonate. In this case best results are obtained by using approximately 45 parts of sodium sulphide and 55 parts of sulphur. The product thus formed however is highly inflammable, heats and melts readily in presence of the atmosphere and presents difficulties in grinding and packing besides giving a considerable percentage of insoluble matter in the finished product.

I claim:

1. A sodium sulphur composition comprising the products of fusion of sodium sulphide and sulphur, and containing at least 60% of polysulphides.

2. A sodium sulphur composition comprising the product of fusion of sodium sulphide, sodium carbonate, and sulphur, and containing at least 60% of polysulphides.

3. A sodium sulphur composition comprising sodium polysulphide, sodium thiosulphate, free sulphur, and sodium sulphate, the sodium polysulphide being not less than 60% and the sodium thiosulphate not more than 10%, of the composition.

4. A sodium sulphur composition containing the following ingredients within the respective limits specified:

|  | Per cent. |
|---|---|
| Sodium polysulphide | 70–80 |
| Sodium thiosulphate | 4–10 |
| Free sulphur | 7–15 |
| Sodium sulphate | 5–10 |

5. A sodium sulphur composition comprising the products of fusion of sodium sulphide and sulphur.

6. The process of making a sodium sulphur composition which comprises fusing together sodium sulphide and sulphur.

7. The process of making a sodium sulphur composition which comprises fusing together sodium sulphide, sodium carbonate, and sulphur.

8. The process of making a sodium sulphur composition which comprises heating sodium sulphide, sodium carbonate, and sulphur for from 1 to 2 hours at a temperature of 230 to 280° C.

9. The process of making a sodium sulphur composition which comprises fusing together sodium sulphide, sodium carbonate, and sulphur, and cooling and grinding the fusion product.

In testimony whereof, I have hereunto set my hand.

FREDERICK A. FRAZIER.